Jan. 13, 1970    D. K. ALEXANDER    3,489,278
CARRIAGES FOR SORTING CONVEYORS
Filed May 1, 1968    3 Sheets-Sheet 1

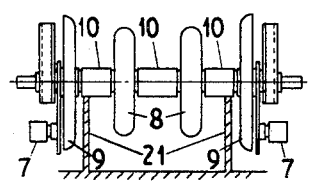
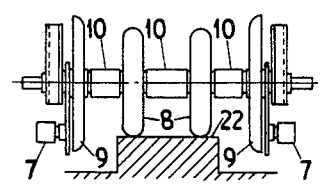
FIG. 4          FIG. 5
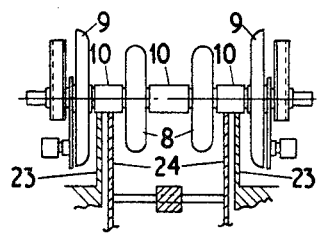
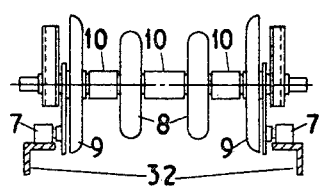
FIG. 6          FIG. 7
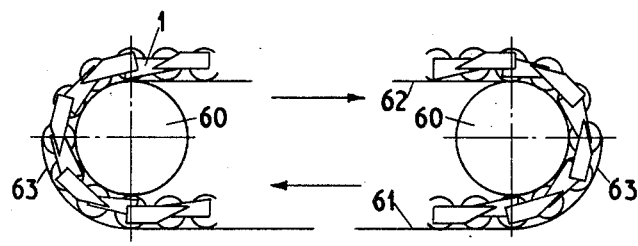
FIG. 11

United States Patent Office 3,489,278
Patented Jan. 13, 1970

3,489,278
CARRIAGES FOR SORTING CONVEYORS
Donald Kenneth Alexander, 1 Whitehill Drive,
Bexhill, Sussex, England
Filed May 1, 1968, Ser. No. 725,812
Claims priority, application Great Britain, May 11, 1967,
21,871/67
Int. Cl. B07c 5/24; B65g 17/16
U.S. Cl. 209—74                                15 Claims

ABSTRACT OF THE DISCLOSURE

An article sorting conveyor machine comprises successive carriages, each pivoted about an axis of attachment to the conveyor and each comprising lateral spaced spindles carrying rotatable wheels providing multi-point support for an article such as an apple. Track means normally support the carriages, but at intervals carriages are allowed to perform a controlled swing-down about their attachment axes for the purpose of unloading an article supported by rotors on adjacent spindles, either under control of a weighbridge, or of a sizing routine.

At other positions along the track, the article-supporting wheels are positively rotated for inspection purposes. The carriage are connected to the conveyor by links so that the carriage can be accurately weighed.

Each weighbridge electrically controls a first "points" device for routing a carriage either along the main conveyor track or down an unloading track via which a carriage passes via a sidings track and a second "points" device to rejoin the main conveyor track. The conveyor and the carriages may be wholly or mainly made of plastics material.

---

This invention relates to article sorting conveyor machine particularly but not exclusively suitable for sorting fruits and vegetables.

It is the object of the present invention to provide more reliable, and more sophisticated, machines, which are less liable to damage fruits passing through them.

Various forms of article sorting machine are known; for example, inspection machines; weight grading machines, and size grading machines.

The present invention relates to inspection and weight grading machines.

In known inspection machines for fruit, parallel spaced rollers are slung across a conveyor and the rollers are driven during movement of the conveyor past an inspection position so as to rotate individual fruits placed on the rollers, so that the whole surface can be visually inspected from above. However, such rollers give only 2-point support to many fruits, and a not very positive rotation. Fruits tend to set on any flat portions of their surfaces, and long stalks may present enough braking power to stop rotation, resulting in incomplete inspection and possible damage to the fruit.

Known forms of weight grading machines comprise transporters for individual articles directly linked to the conveyor, and consisting of shallow textile troughs, or pokes. The transporters, are drawn over weighbridges, but the position of a fruit, for example, and irregularities in shape tend to vary the position of its centre of gravity on the transporter, so that the weighing process is inaccurate.

Important aspects of the invention are the provision of more reliable article inspection equipment, more accurate weighing equipment, and combined inspection and weighing machines.

The invention will be clearly understood from the following description of an embodiment thereof shown in the accompanying drawings in which:

FIGS. 4, 5, 6 and 7 are end elevations similar to FIG. 3 showing different methods of support of the rear end of the transporter for different purposes at different positions in the conveyor run.

FIG. 10 is the electrical circuit of the weighbridge and of the electrically-controlled routing points associated therewith, while FIG. 11 shows how the carriages are guided between their upper and lower paths and along the lower return path.

Figures 2, 3:
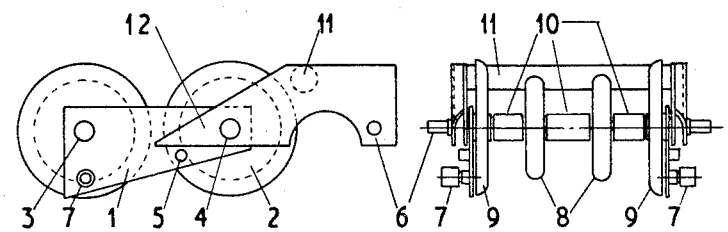
FIG. 2 is a side elevation of a single transporter.
FIG. 3 is an end elevation of the transporter of FIG. 2 from the left hand end.

The machine is arranged for inspection and weigh-sorting in turn, this facility being made possible by the use of a transporter for individual fruits designed to operate in a plurality of different ways according to the varying types of runways on which transporter runs during successive parts of its cycle.

The first difference of this transporter from known transporters is that the main body 1 of the transporter is in effect a 4-wheel carriage and is drawn by a pair of shafts or draglinks 2 pivoted to the front of the transporter at 4 and at their front ends 6 to the conveyor. Thus the whole carriage 1 with its fruit load can rest wholly on a weighbridge, the accuracy of which is not affected by variations in the positions of the centre of gravity of the supported fruit.

Secondly, these carriages are provided with pairs of article supporting members or discs, which are rotatably mounted on fixed spindles 3, 4, and which replace the conventional rollers. The members 8 on a spindle are between larger guard discs 9 and each member 8 is spaced from its adjacent disc 9 by a freely-rotatable spacer-roller 10. The members 8 on each spindle are themselves spaced, either by another spacer-roller 10, or by a spacer integral with the two discs so that the wheels revolve together.

It will be seen that the article-supporting member 8 has a convex periphery for supporting an article without damage. The periphery can be part of a plastic wheel-like member as shown or could be carried on, or a curved extension of, a disc of sheet material with a mounting hub, or on spokes carried by a mounting hub, for example.

In addition to the spindles 3, 4, the shafts 2 are spaced by a tie-rod 11 which also acts as a barrier or guard between articles on its own and the preceding transporter carriage.

The shafts 2 have tails 12 extending above stops 5 on the carriage side plates and acting to prevent the transporter jack-knifing around spindle 4, when supported for example at its rear spindle 3 only, while allowing freedom of movement about spindle 4 when both spindles are supported at a suitable height in relation to the conveyor.

Figure 9:
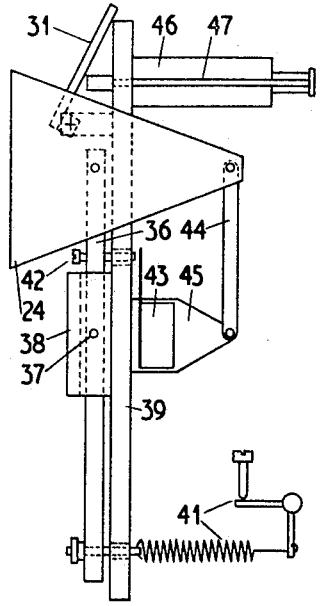
FIG. 9 is an enlarged view of the weighbridge above.

The conveyor consists of parallel spaced chain-links 13, the hollow pivot pins of which carry bearing rollers 14 for engagement with toothed driving and supporting wheels. The hollow pivot-pins constitute journals for the hinge-pins 6 of the transporter shafts 2. The tranporters are spaced along the conveyor as shown in FIG. 9, and the four members 8 of the transporter carriage act as support for fruit, vegetable, or other article.

As will be seen, the 4-point support is more positive and reliable than the usually 2-point support of a pair of rollers.

The rear end of each transporter carries a pair of outrigger rollers 7 adapted to rest on spaced runways parallel to and below the conveyor. However, the construction of the transporter provides several alternative methods of support each having its own use and purpose, as shown in FIGS. 4, 5, 6 and 7, in which runway supports are provided respectively for the outer spacer-rollers 10; the disc members 8; the spacer-rollers 10 in a second manner; and the outrigger rollers 7.

Throughout the major part of the runway cycle, it is desirable to provide 4-point support for each transporter carriage, that is, that each carriage is supported at spaced points on each spindle 3, 4. Because of the special construction of the roller arrays, it is possible to support the carriage in this manner in several different ways giving different operational results.

At the beginning of the operational cycle when the items to be sorted are to be loaded on to the transporter carriages manually or automatically as gently as possible to avoid damage, the roller arrays are kept stationary. For this purpose, the initial runways 21, FIG. 4, for the carriages are so spaced that they support the outer pair of spacers 10, which can roll on the spindle without rotating the wheels 8.

The runways 21 are succeeded by a runway 22, FIG. 5, shown as a continuous platform, for supporting and rotating the four members 8 of a carriage, so that an article supported on the tops of the members 8 will be rotated about its lateral axis. Of course separate runways for the laterally-spaced member 8 could be provided if desired. The runways 21, 22 can overlap to provide continuous support for the carriage.

The items are visually inspected during rotation. The four members 8, being independently driven, provide a more positive rotation of fruits or vegetables, particularly if flat or irregular shape. Long stalked varieties, for example, can also rotate more easily because the stalk or the like can find a passage between the individual members 8.

Of course, if each pair of members 8 were integral with the central spacer 10, a runway supporting the central spacer could be used but this would lack the advantage on the four-wheel drive.

The platform runway 22 is succeeded by spaced runways 23, FIG. 6, which support the outer spacer-rollers 10 and which act merely to transfer the transporters from the visual inspection position to the supports 24 of the first weighbridge which is also shown in outline in FIG. 6. The supports 23, 24 are of the same height and overlap so that a transporter carriage will run smoothly from 23 to 24.

The purpose of the weighbridge is to remove items of above (or below) a certain weight from their transporters and route them to a storage or packing station.

Weight grading usually involves sorting into several different weight ranges, so that a succession of weighbridges is required. A complete weighbridge and sorting device is shown in FIG. 8, and it is to be understood that between successive devices, the transporter carriages travel on runways similar to 32, FIG. 7.

It is desired to support the transporter carriages fully at all times, and this is attained by using a siding-and-points system, broadly similar to railway techniques.

Figure 8:
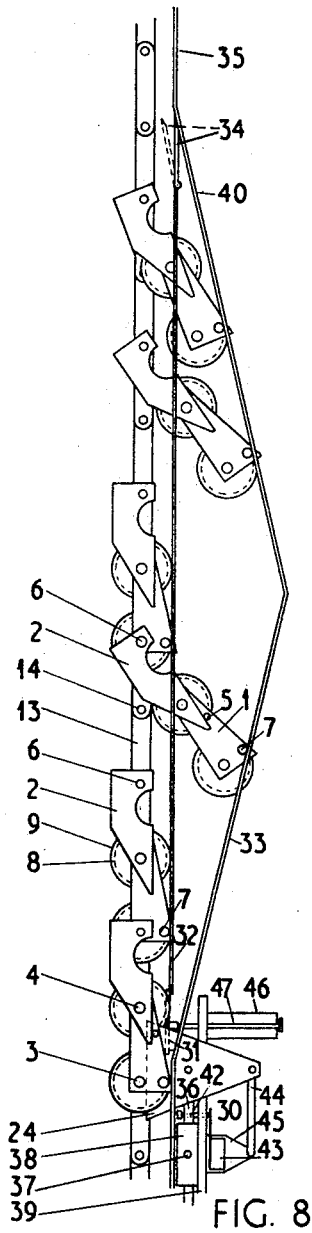
FIG. 8 is a schematic diagram of an electro-mechanical weighbridge forming part of the machine, and the runway arrangements adjacent the weighbridge to illustrate the weighing operation and related controls.

The sidings could of course be on the same level as the main runways, but it is found convenient to run each 'siding' below the main runway, as shown in FIG. 8, the "points" being automatically operated under control of the weighbridge by electromagnetic means as shown in FIG. 9. By using electrical detection and "points" operation, the same positive operation of the points is obtained however marginal is the operation of the weighbridge: with wholly mechanical routing arrangements, damage can occur and the equipment can get locked up.

As seen in FIG. 8, the weighbridge 30 is followed by "points" 31 co-operating with the succeeding main runway 32 and a low-level "siding" 33.

The weighbridge 30 comprises a pair of transporter carriage supports 24 consisting of triangular plate members standing bases upwards in spaced vertical planes, in gaps in the main runway, the bases forming the supporting surfaces. The members 24 are each pivotally supported on one end of a respective balance lever 36 pivoted at 37 in a channel member 38 mounted on the frame 39 and limiting the movement of the balance lever. The lever 36 is controlled by an adjustable spring force 41. The lever 36 carries an adjusting screw 42 passing through the frame 39 to operate a micro-switch 43, when the support 24 is depressed.

The apex of support 24 is pivotally connected by a link 44 to a frame member 45, the link forming a parallel-motion linkage with part of balance lever 36 so that the support surface always remains horizontal.

Mounted on the underside of frame 39 is an electric solenoid 46, the armature of which controls the points lever 31 by rods 47, as shown in FIG. 9. The points lever is normally in a diagonal position cooperating with the siding runway 33, so that if an article on a transporter carriage is underweight, the weighbridge is not operated and the transporter passes into the siding.

Figure 10:
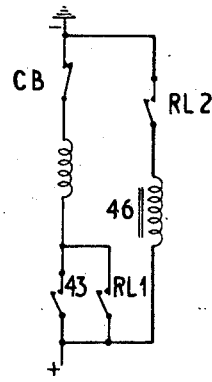

The electrical circuit interconnecting the weighbridge and the "points" is shown in FIG. 10 in the idle position. When the weighbridge support 24, FIG. 8 is depressed, lever 36 operates electrical contacts 42, 43, to close the circuit for an electromagnetic relay RL, FIG. 10 (not shown in FIGS. 8, 9) which closes its contacts RL1 to lock operated independently of the weighbridge contacts, and closes its contacts RL2 to operate the solenoid 46. The core of the solenoid raises its rod 47 to raise the points lever 31. The relay circuit includes a normally closed circuit breaker CB which is mounted in a position (not shown) adjacent the approach to the weighbridge so that CB is opened by each transporter as it enters the weighbridge, so as to release RL and solenoid 46, if operated, so that the points lever may be returned to normal in readiness for dealing with the succeeding transporter.

When the weighbridge 30 is operated by a transporter carriage, the points lever 31 will be raised. The points lever 31 incorporates a platform wide enough to support both members 8 of a carriage.

The transporter passes on over the points platform in horizontal position to the succeeding main runway 32, FIG. 9, and so on. When a transporter enters the siding, the runways 33 of which are spaced to receive the outrigger rollers 7, for example; the shafts 2 are still supported by the conveyors 13, 14, so that as the transporter 1, 2 pivots downwards as a whole under control of stops 5, it deposits the article supported thereon on to a lateral conveyor (not shown) which transports it to a storage or packing station.

Figure 1:
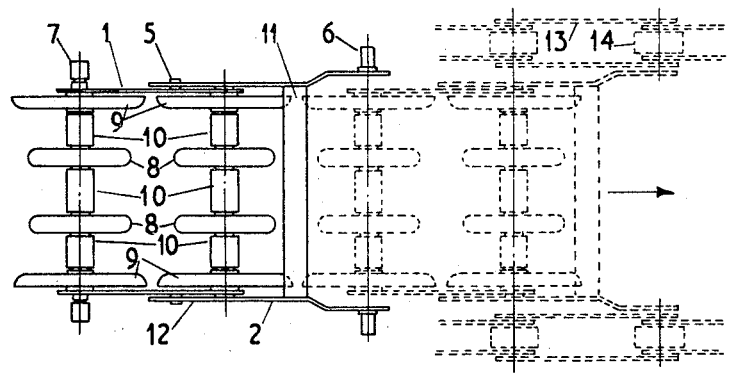
FIG. 1 is a plan view of part of a sorting machine showing part of the conveyor, and two successive transporters.

It will be seen that instead of the transporter being allowed to swing down without support other than the conveyor, the carriage is always supported, and that after depositing the article, it is guided by the "siding" runway up the incline 40 and through the re-entry points 34 to re-enter the line of transporters passing along the succeeding portion of the main runway 35. Thus a succession of transporters, closely-spaced as indicated in FIG. 3, and with the tie-rod barriers 11. FIG. 1, fore and aft of each carriage to contain the articles thereon, are drawn in an unbroken train past the loading and inspection positions. At the first weighbridge, a selection of transporters will leave the main train and pass via the siding, rejoining the main train at the end of the siding. After similar alternative routings at succeeding weighing positions, the train of transporters reaches the end of the conveyor, where all remaining articles on the transporters will be delivered to a final storage or packing station, either direct or via a final lateral conveyor.

It will be seen that in the circumstances described, the lighter articles are sorted out first, and the heaviest articles eventually leave the end of the conveyor.

Obviously, the settings of the weighbridges, or the idle positions of the points levers could be adjusted, so that the heaviest articles were sorted out first and so on.

Instead of the two article-supporting members 8 on each transporter carriage spindle, only one could be provided on one spindle, so that there was 3-point support for articles. It is possible to have more than two such members on the spindles, the members being of varying diameters so as to cater for varying shapes and sizes of article. The members 8 could be polygonal instead of circular.

It will be seen that the tie-bars 11 and the guard discs 9 constitute article-containing members on all four sides of a conveyor-carriage.

The transporters are preferably made of plastics materials, as can the conveyor.

The transporters could be pushed instead of being pulled, or could be pulled in one direction and pushed in the return direction, via a different route also provided with sorting equipment.

The carriages can be supported on three "wheels" instead of four, or by more than two pairs of wheels.

While different runways are provided for the transporter carriage in FIGS. 4, 6 and 7, a single pair of runways can in fact be used, providing that in the case of the run-up to each weighbridge, the runway does not interfere with the weighing operation. Similarly, the points lever platform could be replaced by spaced tracks on the points lever in line with the main runways.

The individual article-container discs 9 could be replaced by horizontal article-retainer rails along the sides of the conveyor.

Other variants within the scope of the appended claims can give at least some of the operational advantages given by the presently-preferred embodiment described: for example, for inspection only, the support arrangements 8, 9, 10 could be mounted on spindles carried directly by the conveyor; or, for weighing only, the support arrangements 8, 9, 10 on spindles 3, 4 per carriage, could be replaced by any other form of article support.

FIG. 12 shows schematically the method of supporting the carriages 1 at the ends of the conveyor runway and on the return path. The endless conveyor chains pass around drive wheels, not shown, at each end, and the carriages are guided around the ends by annular guides 60 rotating with the drive wheels. Below the bottom plane of the guides 60 are horizontal runways schematically indicated at 61, spaced equally to, and respectively vertically below, the upper runways shown in FIG. 7, which are schematically indicated at 62. The ends of the rails 61 curve up at co-axially with the outer lower quadrants of the annular guides 60 and spaced therefrom sufficiently to accommodate the carriages with some small radial play.

As the carriages reach the right-hand end of the rails 62, they pass on to the annular guides 60. The carriages tend to drop away from the annular guides during their downward travel then encounter the curved guides 63 after which they are supported by rails 61 throughout their return path. At the other end, the carriages are guided upwards by the upward curve of the ends of the rails 61 and eventually move over into contact with the left-hand annular guide 60 before riding on to the rails 62.

It will be seen from FIGS. 1 and 8 that the spacing of the successive rotor spindles 3, 4, 3, 4 . . . is substantially constant throughout. In consequence by removing the bars 11, articles can be carried between rear and front rotors on adjacent carriages. By providing a diversion or switchback, similar to 33, 40, FIG. 8, in place of part of the horizontal runway 32, and unaccompanied by a weighbridge, so that every carriage in turn passes along the switchback, the rear spindle 3 of each carriage would be lowered before the front spindle 4 of the succeeding carriage so that the spacing of such spindles would be temporarily increased. It will be seen that the studs 5 will prevent the front spindles descending until the respective rear spindles descend.

Thus an article supported by two spindles 3, 4 might be released during such temporary increase of spacing if its dimensions allowed this to happen.

In this way, articles below a given size could be removed from the conveyor. By having more than one such switchback at spaced intervals in the conveyor, with different angles of descent and consequently different increases in spacing, selection of articles of different sizes can be achieved.

Thus the machine described can be adapted for weight grading and/or size grading.

In a machine for sizing only, the links 2 can be omitted, and the rotor spindle 4 will be pivoted to the conveyor; bars 11 being removed as before. The spacing of the successive spindles 4, 3, 4, 3 . . . from right to left, FIG. 1 will remain the same; or the spacing 3, 4 will be of the same order as the spacing 4, 3; but a rear spindle 3 will descend a greater distance down a given slope for the same movement of the conveyor due to the shorter distance 4, 3 compared with 6, 3, FIG. 2.

The runway 22 could be replaced by a moving belt moving in the same direction as the conveyor but at higher speed, so as to rotate the upper part of the fruit in the direction of movement of the conveyor. This avoids a feeling of vertigo by the inspector.

What I claim is:

1. An article sorting conveyor machine which comprises successive carriages, each pivoted about an axis of attachment to the conveyor and each comprising at least two lateral spaced spindles which together carry a plurality of rotors and track means which normally support the carriages and which allow carriages to swing down about their attachment axes for the purpose of unloading an article supported by rotors on adjacent spindles.

2. Machine as claimed in claim 1 comprising means for controlling the extent of swing down of the carriages.

3. Machine as claimed in claim 2 wherein the runway comprises one or more switchback portions for size grading.

4. Machine as claimed in claim 3 wherein each carriage comprises two lateral spaced rotor-carrying spindles, one of which constitutes the pivotal connection to the conveyor, and wherein the front spindle of each carriage is spaced from the rear spindle of the preceding carriage, while both are normally supported by the track, by a distance suitable for carrying articles of minimum size.

5. Machine as claimed in claim 1 wherein the pairs of lateral spindles on each carriage together carry at least three rotatable discs or wheels relatively positioned so as to provide multi-point support for an article.

6. An article sorting machine as claimed in claim 1 and which comprises means for positively rotating discs or wheels on all the carriages during their passage past an inspection position.

7. Machine as claimed in claim 1 wherein the carriages are connected to the conveyor by links pivoted both to the conveyor and to the carriages, and a runway supports each carriage at three points at least.

8. Machine as claimed in claim 7 which incorporates at least one weighbridge which is arranged so that each carriage in turn rests wholly on the weighbridge.

9. Machine as claimed in claim 8 comprising an article sorting device electrically controlled by a weighbridge.

10. Machine as claimed in claim 8 and wherein the weighbridge controls a first "points" device for routing a carriage either along the main conveyor track or down an unloading track via which a carriage passes via a sidings track and a second "points" device to rejoin the main conveyor track.

11. Machine as claimed in claim 8 wherein the weighbridge comprises a pair of spaced runway members which are positioned in a break in the main runways for the carriages and which have depth so as to be individually carried by a parallel linkage in a vertical plane, one parallel link of which is one arm of a weighbridge lever, and the other end of which is force-controlled.

12. Machine as claimed in claim 1 wherein at different parts of the machine, the carriages run on the runway alone, on rotor driving members alone, and on a weighbridge alone.

13. Machine as claimed in claim 1 arranged to subject articles passing along the conveyor to an automatic rotation at one or more positions, and to automatic weighing at one or more other positions, along the conveyor.

14. Machine as claimed in claim 1 wherein the carriages are made of plastics material.

15. Machine as claimed in claim 14 wherein the conveyor is made of plastics material.

References Cited

UNITED STATES PATENTS

| | | | |
|---|---|---|---|
| 483,232 | 9/1892 | Marvel | 198—147 |
| 2,936,875 | 5/1960 | Von Kritter | 198—147 X |

RICHARD A. SCHACHER, Primary Examiner

U.S. Cl. X.R.

198—39, 147; 209—121